United States Patent
Onishi et al.

(10) Patent No.: US 9,948,717 B2
(45) Date of Patent: Apr. 17, 2018

(54) VEHICLE-MOUNTED COMMUNICATION DEVICE, INTER-VEHICLE COMMUNICATION SYSTEM, AND COMMUNICATION METHOD

(71) Applicant: TOYOTA JIDOSHA KABUSHIKI KAISHA, Toyota-shi, Aichi (JP)

(72) Inventors: Ryokichi Onishi, Tokyo (JP); Toshiyuki Namba, Nisshin (JP); Satoshi Yamada, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 14/437,643

(22) PCT Filed: Oct. 1, 2013

(86) PCT No.: PCT/JP2013/005852
§ 371 (c)(1),
(2) Date: Apr. 22, 2015

(87) PCT Pub. No.: WO2014/073148
PCT Pub. Date: May 15, 2014

(65) Prior Publication Data
US 2015/0296019 A1    Oct. 15, 2015

(30) Foreign Application Priority Data
Nov. 7, 2012 (JP) ................. 2012-245508

(51) Int. Cl.
*G06F 15/16* (2006.01)
*H04L 29/08* (2006.01)
(Continued)

(52) U.S. Cl.
CPC .......... *H04L 67/12* (2013.01); *H04L 61/2503* (2013.01); *H04L 67/141* (2013.01);
(Continued)

(58) Field of Classification Search
CPC ....... H04W 12/06; H04W 8/26; H04W 84/12; H04W 88/04; H04W 84/18; H04L 67/141; H04L 67/12; H04L 61/2503
See application file for complete search history.

(56) References Cited

U.S. PATENT DOCUMENTS

| 8,660,734 B2 * | 2/2014 | Zhu | G05D 1/0055 701/23 |
| 9,357,331 B2 * | 5/2016 | Huang | H04W 4/003 |

(Continued)

FOREIGN PATENT DOCUMENTS

| JP | 2003324381 A | * | 11/2003 |
| JP | 2007-174120 A |   | 7/2007  |

(Continued)

OTHER PUBLICATIONS

Fang, Ping et al., "Specification Framework for TGai (12/15Ir15)," http://www.ieee802.org/11/Reports/tgai_update.htm (online), IEEE, Retrieval on Oct. 17, 2012.

*Primary Examiner* — Hieu Hoang
(74) *Attorney, Agent, or Firm* — Oliff PLC

(57) ABSTRACT

A vehicle-mounted communication device for transmitting uplink data as data generated in a vehicle includes a first wireless communication unit configured to establish an uplink connection to a second vehicle-mounted communication device, a second wireless communication unit configured to establish a downlink connection to a third vehicle-mounted communication device, an authentication unit configured to authenticate the third vehicle-mounted communication device, an address management unit configured to assign a network address to the third vehicle-mounted communication device, and an address translation unit configured to perform translation of the network address assigned from the second vehicle-mounted communication (Continued)

device and the network address used by the vehicle-mounted communication device.

8 Claims, 9 Drawing Sheets

(51) Int. Cl.
    *H04W 12/06*     (2009.01)
    *H04L 29/12*     (2006.01)
    *H04W 84/18*     (2009.01)
    *H04W 8/26*     (2009.01)
    *H04W 84/12*     (2009.01)
    *H04W 88/04*     (2009.01)

(52) U.S. Cl.
    CPC .............. *H04W 12/06* (2013.01); *H04W 8/26* (2013.01); *H04W 84/12* (2013.01); *H04W 84/18* (2013.01); *H04W 88/04* (2013.01)

(56) References Cited

U.S. PATENT DOCUMENTS

| | | | |
|---|---|---|---|
| 9,634,726 B2 * | 4/2017 | Kuscher | H04B 5/0031 |
| 2006/0193292 A1 * | 8/2006 | Bansal | H04L 47/70 |
| | | | 370/331 |
| 2007/0087756 A1 * | 4/2007 | Hoffberg | G06Q 10/0631 |
| | | | 455/450 |
| 2009/0010268 A1 * | 1/2009 | Giacomazzi | H04W 84/00 |
| | | | 370/400 |
| 2009/0296680 A1 * | 12/2009 | Suzuki | H04W 72/0406 |
| | | | 370/342 |
| 2010/0202346 A1 * | 8/2010 | Sitzes | H04W 84/18 |
| | | | 370/328 |
| 2010/0256852 A1 * | 10/2010 | Mudalige | G08G 1/163 |
| | | | 701/24 |
| 2012/0034876 A1 * | 2/2012 | Nakamura | H04L 9/321 |
| | | | 455/66.1 |
| 2012/0108163 A1 * | 5/2012 | Bai | H04L 12/1854 |
| | | | 455/3.06 |
| 2012/0324067 A1 * | 12/2012 | Hari | G06F 13/385 |
| | | | 709/222 |
| 2014/0127992 A1 * | 5/2014 | Kuscher | H04B 5/0031 |
| | | | 455/41.1 |

FOREIGN PATENT DOCUMENTS

| | | | |
|---|---|---|---|
| KR | 100909070 B1 | 7/2009 | |
| WO | 2008/022272 A2 | 2/2008 | |
| WO | WO 2008022272 A2 * | 2/2008 | ......... H04L 12/4641 |
| WO | WO 2009139562 * | 7/2009 | ............ H04W 88/04 |

* cited by examiner

| CONNECTION DESTINATION OF UPLINK COMMUNICATION SECTION | ESS-ID OF DOWNLINK COMMUNICATION SECTION |
|---|---|
| None | Adhoc |
| Internet Gateway | Inet0 |
| Inet(n) | Inet(n+1) |
| Adhoc | Adhoc |

FIG.5

VEHICLE-MOUNTED COMMUNICATION DEVICE, INTER-VEHICLE COMMUNICATION SYSTEM, AND COMMUNICATION METHOD

TECHNICAL FIELD

The present invention relates to a technology for performing communication between vehicles.

BACKGROUND ART

In recent years, a study for collecting data from a running vehicle and utilizing the data is conducted. For example, by collecting current positions and speed information from a plurality of vehicles, it is possible to generate traffic jam information on a real-time basis. Further, if the destination and route information of each vehicle are collected, it is possible to predict a traffic flow. In addition to these, if the cycle of a traffic signal is analyzed from collected data, it is possible to inform a driver of the remaining time of a green light so that unnecessary acceleration and deceleration can be prevented. Thus, by analyzing data collected from vehicles from various angles, it is possible to implement smooth traffic.

In order to collect data from vehicles, it is necessary to mount a wireless communication device on each vehicle. However, a mobile communications service such as 3G or LTE is not available in all vehicles due to the cost thereof. Although it is possible to transmit data by using a public wireless LAN, data can be uploaded only when the vehicle is in a service range.

In order to solve this problem, a method is available in which data is transferred by utilizing inter-vehicle communication. Specifically, in the method, vehicles transfer data to each other by utilizing a relatively inexpensive communication device of a wireless LAN or the like, and a vehicle capable of using the connection to a wide area network such as the Internet or the like uploads the data.

However, herein, the problem is encountered that importance is not placed on responsiveness in an authentication system currently used in the wireless LAN, and negotiation takes time. In a case where information is exchanged between vehicles, a communication time is limited, and hence the communication needs to be established as quickly as possible.

Technologies that solve this problem include communication standards described in Non Patent Literature 1. The standards achieve the speedup of an authentication process in wireless LAN standards (IEEE802.11), and the standardization thereof is promoted as IEEE802.11ai as of 2012. The standards implement high-speed negotiation by simplifying the individual sequences of location, authentication, and connection of a terminal in the conventional authentication process.

CITATION LIST

Non Patent Literature

[NPL1] "Status of Project IEEE 802.11ai", [online], IEEE, [Retrieval on 17 Oct. 2012], the Internet <URL: http://www.ieee802.org/11/Reports/tgai_update.htm>

SUMMARY OF INVENTION

Technical Problem

Since the standards described in Non Patent Literature 1 provide high-speed negotiation in the wireless LAN, the standards are suitable for the inter-vehicle communication in which the communication time is limited. However, the simplification of the sequence in the connection cannot solve the problem that the authentication itself takes time.

In IEEE802.1x standards, an authentication protocol called EAP (Extensible Authentication Protocol) is used for client authentication. When an access point using EAP is accessed by a client, the access point communicates with a server (RADIUS server) in charge of authentication to receive authentication. When the client is authenticated, a port is opened and it becomes possible to perform the communication.

This system has a drawback that the processing takes time due to its characteristic that an external authentication server is used. For example, if it is assumed that a time when vehicles remain in an area in which the vehicles can communicate with each other is 10 seconds and the communication device needs 5 seconds from the location of the communication partner to the completion of the authentication, the communication time that can be secured is 5 seconds. However, in reality, the establishment of a connection for data communication is started after the completion of the authentication, and hence there is a possibility that the substantial time when the communication can be performed cannot be secured.

Solution to Problem

The present invention has been achieved in view of the above problem, and an object thereof is to provide a vehicle-mounted communication device capable of establishing wireless communication in a short period of time.

The present invention in its one aspect provides a vehicle-mounted communication device for transmitting uplink data as data generated in a vehicle, comprising a first wireless communication unit configured to establish an uplink connection to a second vehicle-mounted communication device; a second wireless communication unit configured to establish a downlink connection to a third vehicle-mounted communication device; an authentication unit configured to authenticate the third vehicle-mounted communication device; an address management unit configured to assign a network address to the third vehicle-mounted communication device; and an address translation unit configured to perform translation of the network address assigned from the second vehicle-mounted communication device and the network address used by the vehicle-mounted communication device.

The vehicle-mounted communication device according to the present invention relays the uplink data between the vehicle-mounted communication devices to thereby cause the uplink data to reach a target node. In addition, the vehicle-mounted communication device has the unit for performing a series of procedures required for the connection between the communication devices such as the authentication of the terminal and the assignment of the network address for the other vehicle-mounted communication device. In authentication standards used in a conventional wireless LAN, these procedures have been performed by a dedicated device so that negotiation between the communication devices has taken time. In contrast, in the present invention, since each vehicle-mounted communication device has the authentication unit and the address management unit, it is possible to reduce the time required for the negotiation. Note that, since it is necessary to individually perform the management of the network address for each vehicle, the vehicle-mounted communication device according to the present invention performs communication with the other vehicle-mounted communication device by using network address translation (NAT).

Note that the uplink connection in the present invention denotes a connection in an upstream direction of the network, i.e., a connection to a wide area network side, while the downlink connection denotes a connection in a downstream direction opposite to the uplink connection.

The first wireless communication unit may establish the uplink connection to the access point, in a case where an access point connected to a wide area network is available.

In the case where the connection to the access point is available, the first wireless communication unit may establish the uplink connection to the access point to transmit the data to the wide area network. In the case where the connection to the access point is not available, the first wireless communication unit may transfer the data to the other vehicle-mounted communication device. With this, it is possible to cause the data to transmitted to quickly reach the wide area network. The wide area network is a network used to collect data such as, e.g., the Internet or the like.

The second wireless communication unit may receive the uplink data transmitted from the third vehicle-mounted communication device, and the first wireless communication unit may transmit the uplink data generated in a host vehicle or the uplink data received from the third vehicle-mounted communication device to the second vehicle-mounted communication device or the access point through the uplink connection.

With the configuration described above, it is possible to transmit the uplink data to the access point through multi-hop communication.

The vehicle-mounted communication device can further comprise a data transfer unit configured to temporarily store the uplink data generated in the host vehicle or the uplink data received from the third vehicle-mounted communication device, and to transfer the uplink data to the second vehicle-mounted communication device or the access point through the first wireless communication unit, wherein the data transfer unit may transmit the stored uplink data at a timing when the first wireless communication unit establishes the uplink connection to the access point or the second vehicle-mounted communication device.

In a case where the uplink connection is not available, the uplink data may be temporarily stored, and transmitted at the timing when the connection becomes available. With the configuration described above, it is possible to reliably cause the uplink data to reach the access point.

The second wireless communication unit may provide a plurality of network identifiers, and relay data received via at least one of the plurality of network identifiers to the first wireless communication unit without an intervention of the data transfer unit.

The second wireless communication unit may provide the plurality of network identifiers such as an ESS-ID or the like. Among them, in a case where the connection to the identifier for the downlink connection is established, the data transfer unit may provide the function of transferring the uplink data and, in a case where the connection to the other identifiers is established, only the relay of the data to the first wireless communication unit may be performed. With this, it becomes possible to relay the data other than the uplink data to the uplink side and provide the wide area network connection to a user inside and outside the vehicle.

The uplink data may be data acquired from a sensor provided in the vehicle.

The uplink data may be any data as long as the uplink data is information that can be acquired from devices such as the sensor provided in the vehicle and the like. For example, the uplink data may be a numerical value such as a speed or an acceleration, or may also be positional information acquired from a GPS device. Thus, by having sensing data as the collection target, it is possible to contribute to smooth traffic.

Further, the vehicle-mounted communication devices according to the present invention may be performed communication respectively using a different network address space.

In a case where the communication is performed by using the plurality of the vehicle-mounted communication devices, the vehicle-mounted communication devices preferably use different network address spaces. There are two advantages obtained by this. One advantage is that, since the network address space is closed for each vehicle, it is possible to perform the assignment of the address at high speed. The other advantage is that what is called loopback in which the uplink side and the downlink side are connected does not occur.

Note that the present invention can be defined as the vehicle-mounted communication device including at least a part of the above-described means. In addition, the present invention can also be defined as the inter-vehicle communication system including a plurality of the vehicle-mounted communication devices, and can also be defined as the wireless communication method performed by the vehicle-mounted communication device. The above-described processing and means can be freely combined and implemented as long as a technical contradiction does not arise.

Advantageous Effects of Invention

According to the present invention, it is possible to provide the vehicle-mounted communication device capable of establishing the wireless connection in a short period of time.

BRIEF DESCRIPTION OF DRAWINGS

FIG. 5 is a list of an ESS-ID assigned to a downlink communication section;

DESCRIPTION OF EMBODIMENTS

Figure 1:
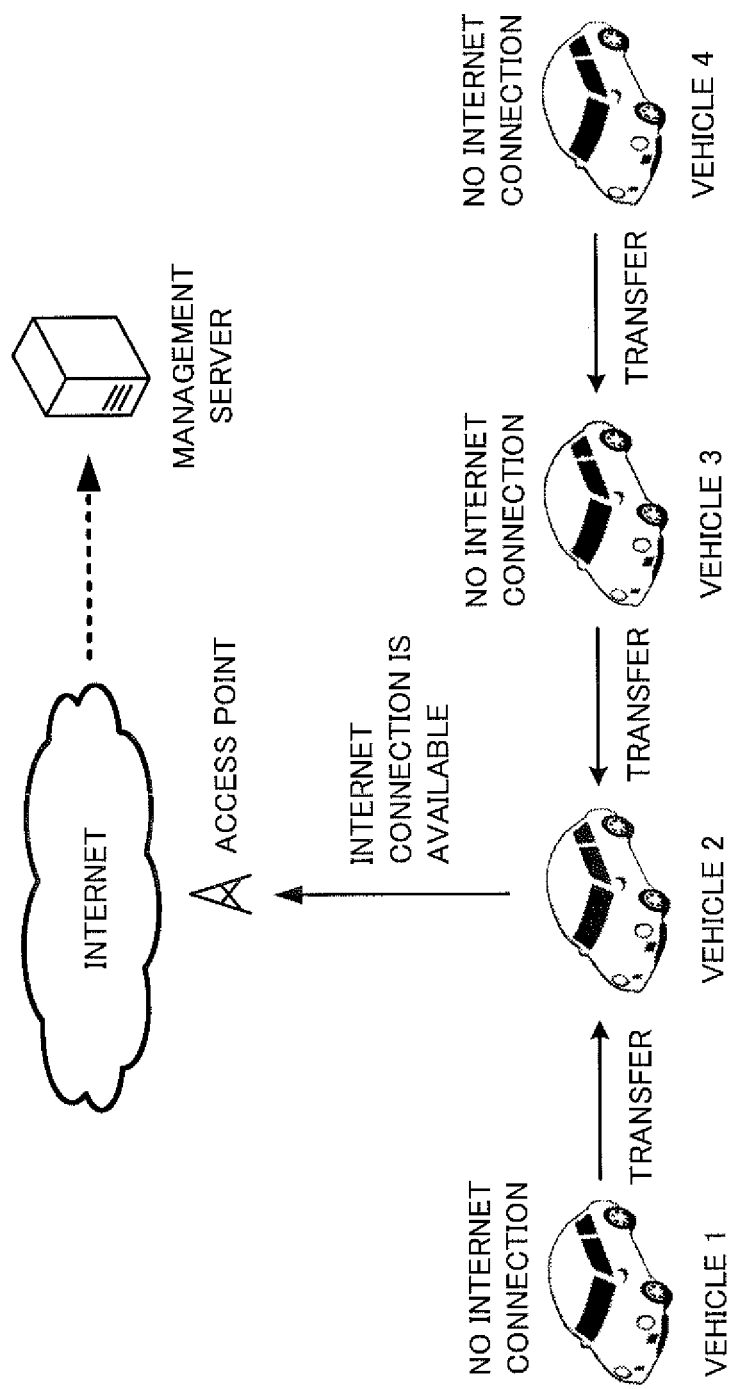
FIG. 1 is a view for explaining the outline of communication performed by a vehicle-mounted communication device according to the present invention.

First, the outline of communication performed by a vehicle-mounted communication device according to the present invention will be described with reference to FIG. 1. The vehicle-mounted communication device according to the present invention is a wireless communication device that transmits data generated in a vehicle to a server (hereinafter referred to as a management server) that collects the data. In the description of embodiments, the data generated in the vehicle (hereinafter referred to as uplink data) is data for collection of information on the running state of the vehicle (hereinafter referred to as probe data).

When the uplink data is generated, the vehicle-mounted communication device determines whether or not an Internet connection is available in the vehicle. In a case where the Internet connection is not available, the vehicle-mounted communication device searches for another vehicle on which the vehicle-mounted communication device is mounted, and transfers the uplink data by using wireless communication. The vehicle-mounted communication device having received the data repeats the same operations, and the uplink data finally reaches the vehicle in which the Internet connection is available. In the example of FIG. 1, data generated from a vehicle 4 is transferred to a vehicle 3, similarly transferred to a vehicle 2, and then transmitted to a management server via the Internet. Thus, the vehicle-mounted communication device according to the present invention implements the transmission of the uplink data to the management server by performing multi-hop communication between vehicles to relay the data to the vehicle in which the Internet connection is available.

(First Embodiment)

Figure 2:
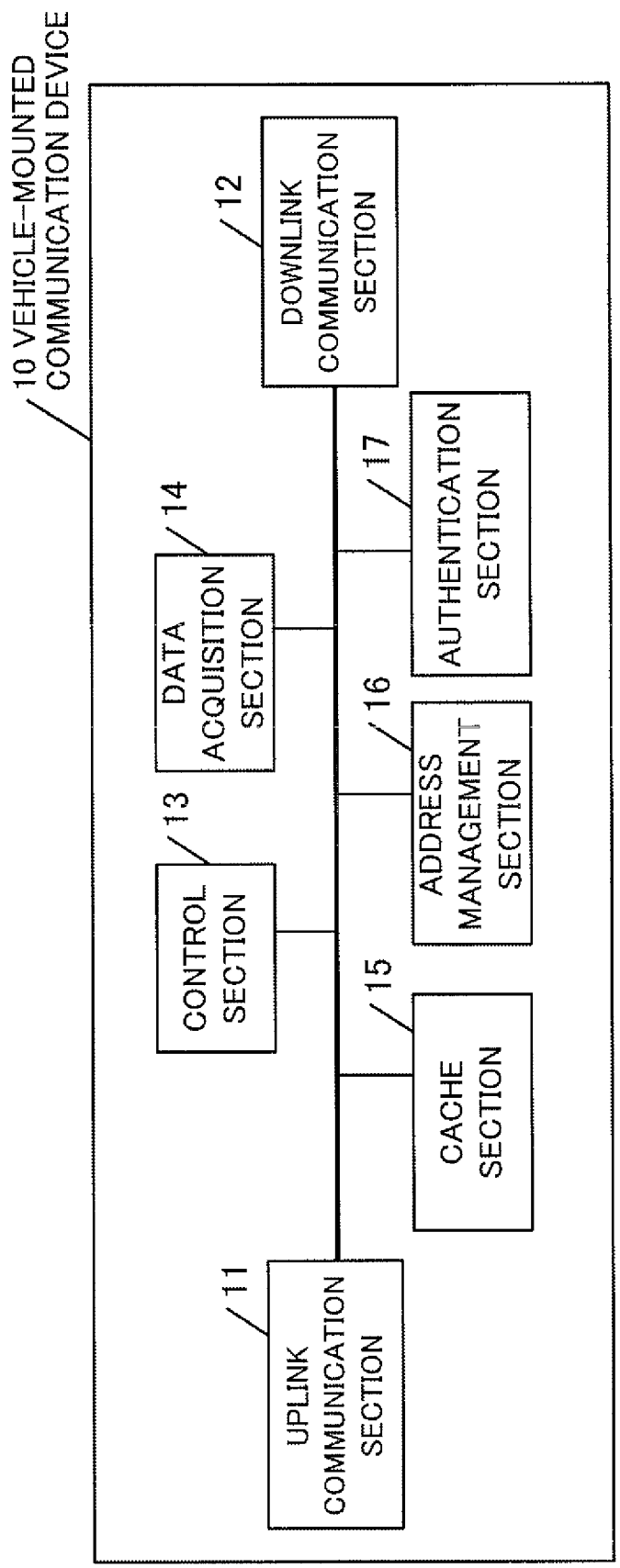
FIG. 2 is a view of a system configuration of a vehicle-mounted communication device according to a first embodiment.

The configuration of a vehicle-mounted communication device 10 according to a first embodiment that implements the above-described operations will be described with reference to FIG. 2.

<System Configuration>

An uplink communication section 11 is wireless communication unit for an upper connection. Specifically, the uplink communication section 11 is a wireless interface that operates as Non-AP-STA (non-access point) in IEEE802.11. The connection destination of the uplink communication section 11 is an access point of a wide area network or another vehicle-mounted communication device (A second vehicle-mounted communication device in the present invention). For example, the uplink communication section 11 connects to the access point of a Wi-Fi (registered trademark) spot or a personal digital assistant during its tethering operation to provide the Internet connection. In addition, the uplink communication section 11 connects to another vehicle-mounted communication device to perform communication therewith.

Note that, authentication is required when the uplink communication section 11 connects to the access point or another vehicle-mounted communication device, and hence the uplink communication section 11 has an authentication client (supplicant) for the authentication therein. A key or a certificate required for the authentication can be pre-stored.

In addition, the uplink communication section 11 has a function for performing NAT (network address translation) with a different network. The detail of operations will be described later.

A downlink communication section 12 is wireless communication unit for a lower connection. Specifically, the downlink communication section 12 is a wireless interface that operates as AP (access point) in IEEE802.11. The connection destination of the downlink communication section 12 is the uplink communication section 11 of another vehicle-mounted communication device (A third vehicle-mounted communication device in the present invention).

The network identifier (ESS-ID) of the AP provided by the downlink communication section 12 is dynamically controlled by a control section 13 described later. In addition, the downlink communication section 12 is capable of providing an access control for equipment requesting the connection using access control means described later. The detail of the processing will be described later.

The uplink communication section 11 and the downlink communication section 12 are interfaces that confirm to an IEEE802.11ai protocol described in Non Patent Literature 1.

The control section 13 is unit for controlling the operation of the entire vehicle-mounted communication device 10. Specifically, the control section 13 controls processing in which the uplink data received from the downlink side is temporarily stored and relayed to the uplink side. The detail of the processing will be described later.

A data acquisition section 14 is unit for collecting the uplink data generated in the vehicle. The uplink data is data having the management server on the Internet as the destination, and is the probe data indicative of the running state of the vehicle, as described above. However, the uplink data may also be information transmitted from a passenger of the vehicle such as an electronic mail or a message to SNS. In a case where the probe data is collected, the data acquisition section 14 receives information from a sensor mounted on the vehicle. The sensor may be a speed sensor or an acceleration sensor, and may also be a GPS device or another computer. In addition, in a case where the information transmitted from the passenger is acquired, the information may be acquired from a personal digital assistant such as a smartphone or the like via the interface such as, e.g., a Bluetooth (registered trademark) or the like.

A data cache section 15 includes a nonvolatile memory and a disk device, and is unit for temporarily storing the uplink data. The uplink data to be stored may be data generated in the host vehicle, i.e., data acquired by the data acquisition section 14, or may also be data received from another vehicle-mounted communication device via the downlink communication section 12.

An address management section 16 is unit for managing a network address used by the vehicle-mounted communication device 10, and assigning the network address to another vehicle-mounted communication device connected to the downlink communication section 12. The address space of the network address managed by the address management section 16 differs from one vehicle-mounted communication device to another. For example, in a case where the network address used by one vehicle-mounted communication device is 172.16.0.0/28, another vehicle-mounted communication device uses the network address of 172.16.0.16/28.

Figure 3:
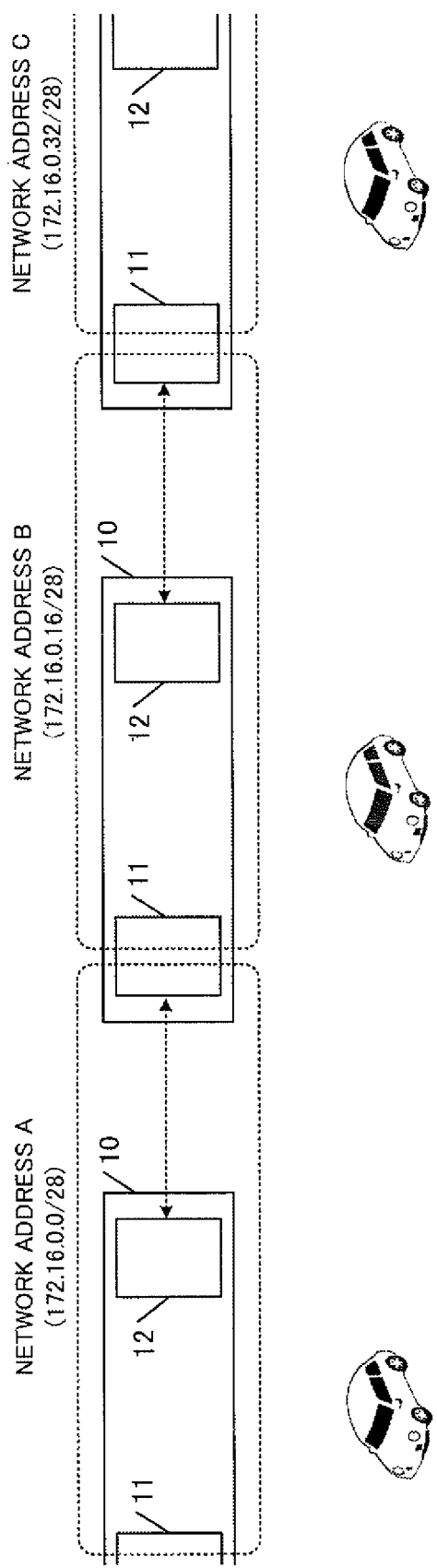
FIG. 3 is a view for explaining a network address of each vehicle-mounted communication device.

FIG. 3 is a view for explaining the range of the network address when the vehicle-mounted communication devices according to the present embodiment are connected to each other. FIG. 3 simplifies and shows only the vehicle-mounted communication device 10, the uplink communication section 11, and the downlink communication section 12. In addition, the area surrounded by a dotted line indicates one network address space. In the present embodiment, since the uplink communication section 11 has the NAT function, different network addresses are used with the uplink communication section interposed therebetween.

When the network address is assigned from the vehicle-mounted communication device as the connection destination during the uplink connection, the uplink communication section 11 starts the network address translation (NAT)

between the device and the host device. It goes without saying that the translation operation is ended when the connection is disconnected.

An authentication section 17 is unit for authenticating another vehicle-mounted communication device connected to the downlink communication section 12. Although the authentication may be performed in any manner as long as it is verified that the device that attempts to connect to the downlink communication section 12 is proper, it is preferable to use the authentication method capable of individually identifying the communication device rather than the authentication method using a common pass phrase. For example, the authentication may be performed by using an electronic certificate issued in advance by an authentication authority such as EAP-TLS (NAP-Transport Layer Security).

Thus, the vehicle-mounted communication device according to the present embodiment is characterized in having the unit for performing the management of the network address and the unit for authenticating another device. With this, as compared with a case where the authentication and the assignment of the address are performed by using an external server, it is possible to reduce the time required for the connection. Further, by utilizing the above-described simplification of the connection sequence by the IEEE802.11ai protocol in combination, it is possible to significantly reduce the total negotiation time. The detail of the processing method and its effect will be described later.

Note that the vehicle-mounted communication device 10 may be implemented by a computer, or may also be implemented by hardware designed for exclusive use. Ina case where the vehicle-mounted communication device 10 is implemented by the computer, a program stored in an auxiliary storage device is loaded to a main storage device, the loaded program is executed by a CPU, and the individual means shown in FIG. 2 thereby function (the CPU, the auxiliary storage device, and the main storage device are not shown in the drawing).

<Uplink Connection Processing>

Figure 4:
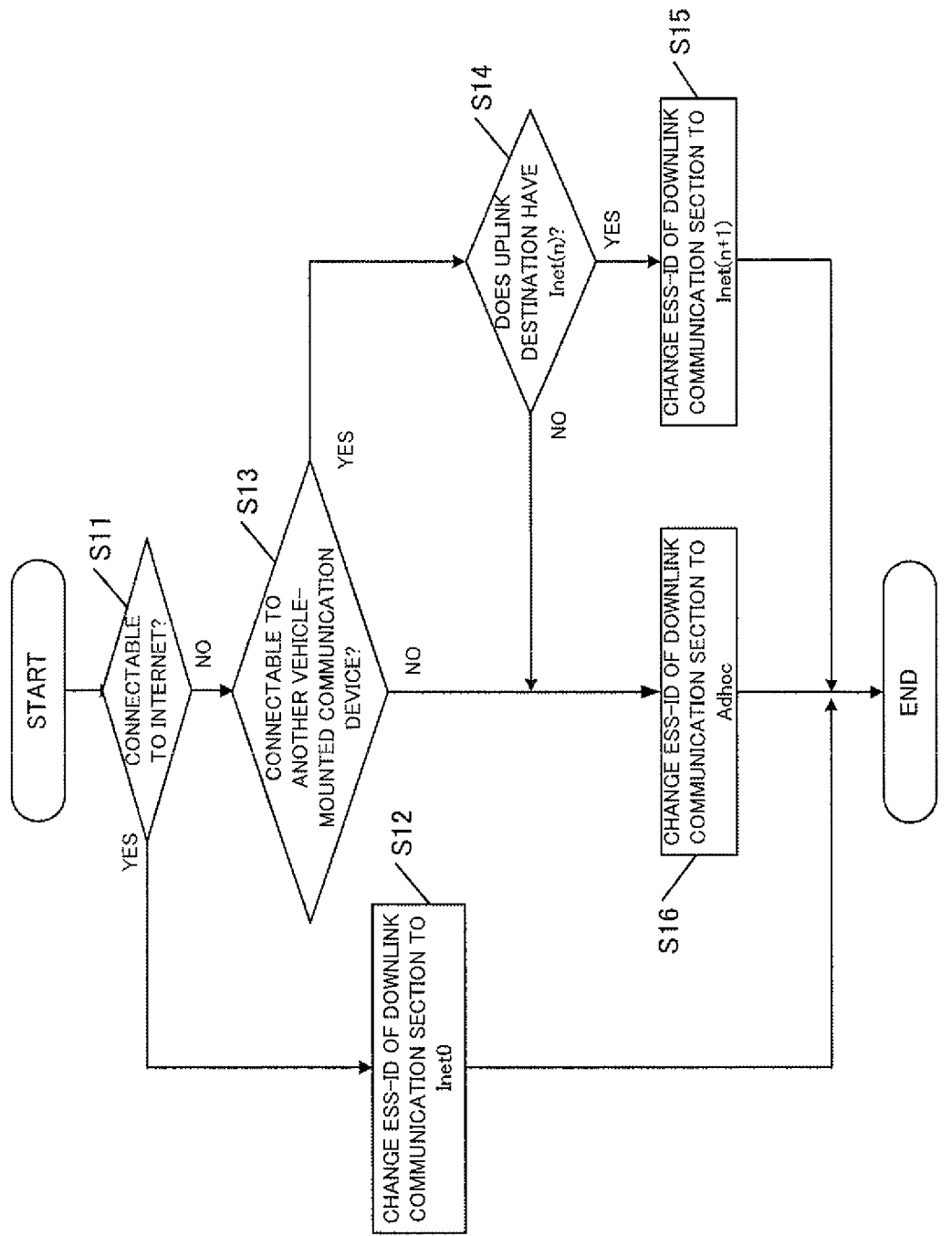
FIG. 4 is a flowchart of connection processing performed by the vehicle-mounted communication device according to the first embodiment.

Next, the detail of processing in which the uplink communication section 11 establishes a connection to another device will be described. FIG. 4 is a flowchart of uplink connection processing performed by the vehicle-mounted communication device according to the present embodiment. The processing of FIG. 4 is periodically executed during the running of the vehicle. For example, the processing may be started with the start of the engine, and may be ended with the stop of the engine.

In Step S11, the control section 13 attempts to connect to the access point that provides the Internet connection (hereinafter referred to as an Internet gateway) through the uplink communication section 11. The Internet gateway is, e.g., the access point of a public wireless LAN or the personal digital assistant that provides tethering. In a case where authentication is required, the authentication is performed by using the authentication client of the uplink communication section 11.

Ina case where the connection to the Internet gateway is established, the control section 13 changes the ESS-ID of the downlink communication section 12 to "Inet0" (S12). "Inet" means communication with the Internet, and a numeric thereof indicates the number of additional hops to the Internet gateway. That is, "Inet0" means that the Internet gateway can be reached without the additional hop.

In a case where the Internet gateway is not located, the control section 13 attempts to connect to another vehicle-mounted communication device (i.e., the downlink communication section 12 of another vehicle-mounted communication device) through the uplink communication section 11 (S13).

In a case where the connection to another vehicle-mounted communication device is established, the control section 13 determines whether or not the ESS-ID of the connection destination includes "Inet" (S14). In a case where the ESS-ID of the connection destination includes "Inet", the uplink destination communicates with the Internet, and hence the ESS-ID of the downlink communication section is changed to Inet (n+1) (S15). For example, in a case where the ESS-ID of the uplink connection destination is "Inet0", the ESS-ID for a downlink connection is "Inet1".

In a case where the ESS-ID of the vehicle-mounted communication device connected in Step S13 does not include "Inet", the vehicle-mounted communication device does not communicate with the Internet, and hence the ESS-ID for the downlink connection is changed to "Adhoc" (S16). The same operation is performed in a case where the uplink connection is not established in Step S13. FIG. 5 shows a table of the setting pattern of the ESS-ID.

By executing the processing described above, the vehicle-mounted communication device according to the present embodiment is capable of establishing the connection in the case where the vehicle-mounted communication device can connect to the Internet through the uplink connection, and informing other devices that the host device communicates with the Internet through the ESS-ID for the downlink connection. In addition, in the case where the host device does not communicate with the Internet, the host device is capable of informing other devices that only an adhoc connection can be established.

Note that, although the processing of FIG. 4 is periodically executed, it is preferable to maintain the connected state in a case where the connection destination is not changed. In a case where a more proper connection destination (e.g., the connection destination in which the number of hops to the Internet gateway is smaller) is located, the uplink connection destination may be switched. However, in this case, the ESS-ID is changed so that the downlink connection is disconnected.

Note that it is preferable to put an upper limit to the number of hops. For example, in a case where the upper limit of the number of additional hops is set to 5, when the ESS-ID acquired in Step S14 is not less than "Inet5" the connection to the device may not be established. In a case where a plurality of the uplink connections are available, the device closer to the Internet may be selected. For example, in a case where three ESS-IDs of "Inet1", "Inet2", and "Adhoc" are located, it is preferable to connect to the device having the ESS-ID of "Inet1".

<Downlink Connection Processing>

Although not shown in the flowchart of the processing, in a case where a connection request is made to the downlink communication section 12 from another vehicle-mounted communication device, the authentication section 17 performs the authentication, the address management section 16 assigns the network address, and the connection is permitted as necessary. By performing this processing and the processing shown in FIG. 4, it is possible to form a daisy chain having the Internet gateway as its end. It goes without saying that the downlink communication section 12 disconnects the connection when the downlink communication section 12 loses the connection partner.

<Transmission Processing of Uplink Data>

The connection processing performed by the vehicle-mounted communication device 10 has been described thus far. Next, the detail of data transmission processing for transmitting the uplink data to management server will be described. Herein, the description will be given of processing in which the uplink data generated in the host vehicle is transmitted to the uplink side and processing in which the uplink data transmitted from another vehicle-mounted communication device through the downlink connection is relayed to the uplink side.

Figure 6:
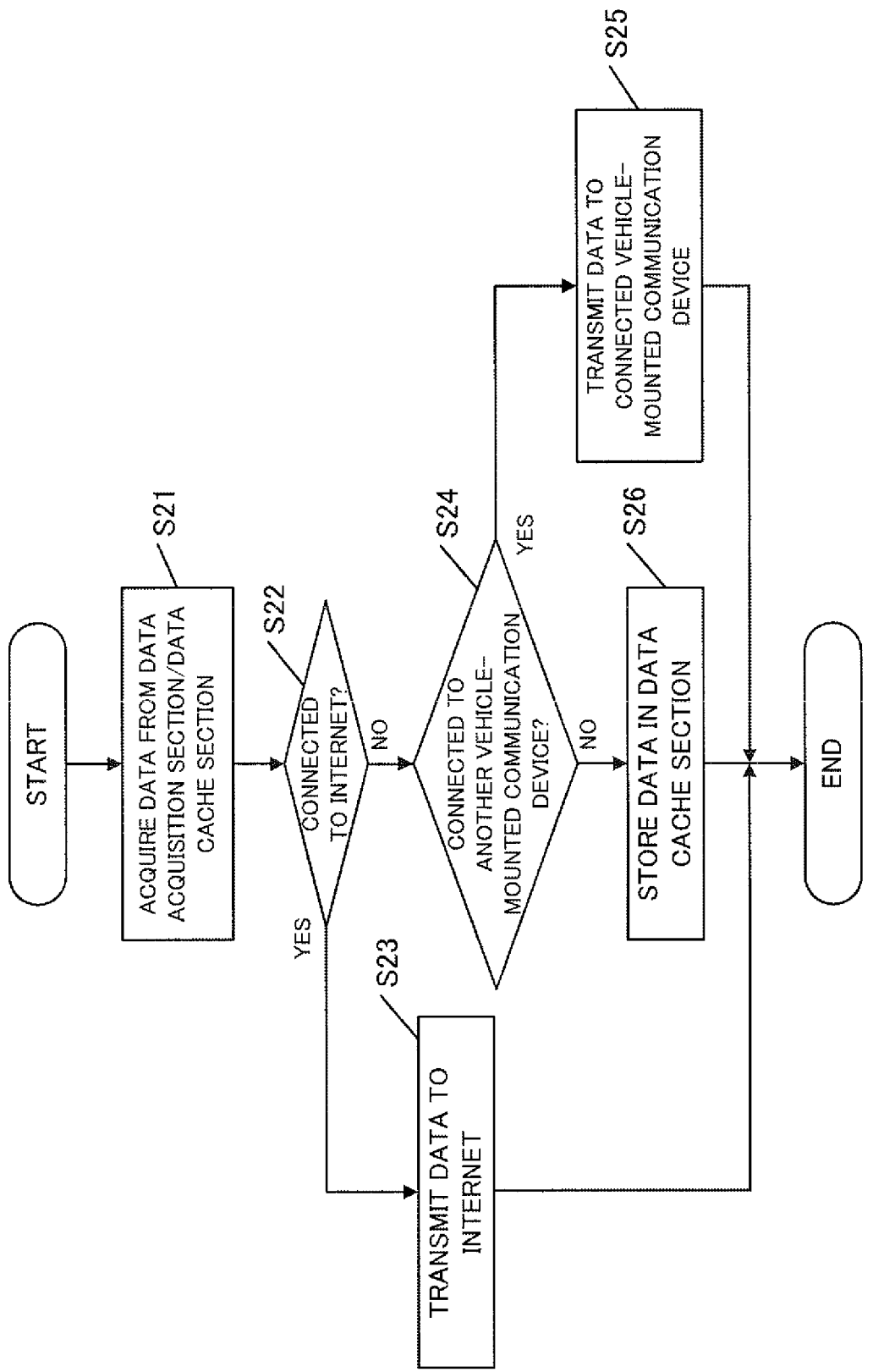
FIG. 6 is a flowchart of data transmission processing performed by the vehicle-mounted communication device according to the first embodiment.

First, the processing in which the uplink data generated in the host vehicle is transmitted will be described with reference to FIG. 6. Similarly to the processing shown in FIG. 4, it is preferable to periodically execute the processing shown in FIG. 6. For example, the processing may be started when a predetermined time elapses since the previous execution. However, the execution period of this processing does not need to synchronize with the execution period of the processing shown in FIG. 4.

First, in Step S21, the control section 13 acquires the uplink data through the data acquisition section 14. In a case where the uplink data is stored in the data cache section 15, the control section 13 acquires the stored data at the same time. The uplink data to be acquired may be any type of data.

Next, the control section 13 determines whether or not the uplink communication section 11 is connected to the Internet gateway (S22). In a case where the uplink communication section 11 is connected to the Internet gateway, the control section 13 connects to the management server through the uplink communication section 11, and uploads the uplink data acquired in Step S21 by using a designated protocol (HTTP, FTP, or the like) (S23). In a case where there are a plurality of the management servers as the transmission destination, a proper transmission destination or protocol may be selected according to the type of the data. For example, in a case where the uplink data is the probe data, the uplink data may be transmitted to a server that collects the probe data and, in a case where the uplink data is an electronic mail, the uplink data may be transmitted to an SMTP server.

In a case where the uplink communication section 11 is not connected to the Internet gateway, the control section 13 determines whether or not the uplink communication section 11 is connected to another vehicle-mounted communication device (S24). In a case where the uplink communication section 11 is connected to another vehicle-mounted communication device, the control section 13 transmits the uplink data to the vehicle-mounted communication device as the connection destination (S25) The communication protocol used herein is a protocol used when the vehicle-mounted communication devices communicate with each other.

In a case where the uplink connection is not available, the control section 13 causes the data cache section 15 to store the uplink data, and ends the processing (S26). Since the processing shown in FIG. 6 is periodically executed, the data stored in the data cache section 15 is transmitted at the time point when the uplink connection becomes available.

<Reception Processing of Uplink Data>

Figure 7:
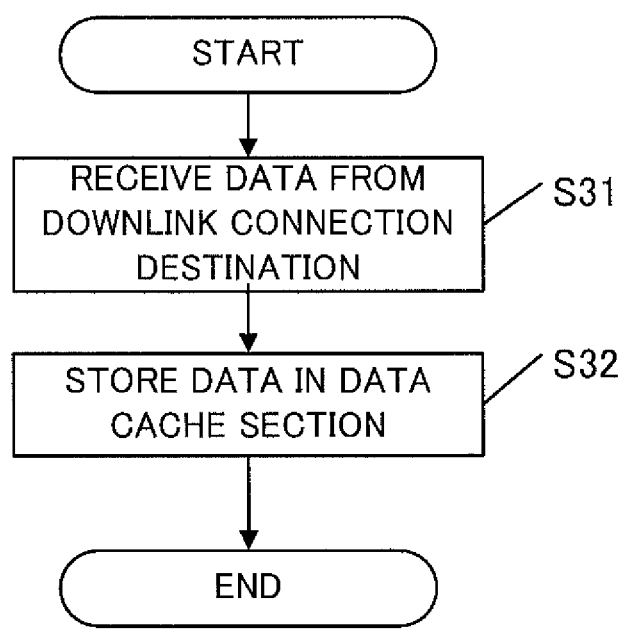
FIG. 7 is a flowchart of data reception processing performed by the vehicle-mounted communication device according to the first embodiment.

Next, processing in which data transmitted from another vehicle-mounted communication device is received will be described with reference to FIG. 7. The processing shown in FIG. 7 is started in a case where the uplink data is transmitted from another vehicle-mounted communication device through the downlink connection. In a case where the data is transmitted from another vehicle-mounted communication device connected through the downlink connection, the control section 13 receives the data through the downlink communication section 12 (S31), and causes the data cache section 15 to temporarily store the data (S32).

<Effect of First Embodiment>

According to the first embodiment, the vehicle-mounted communication devices form the daisy chain, and sequentially transfer the data to the vehicle connectable to the Internet. With this, it is possible to quickly upload the data generated in the vehicle to the management server.

In addition, in the connection between the communication devices, since the authentication is performed by using the authentication unit in the device instead of the external authentication server, the time required for the authentication is short. Further, similarly, since the address management unit in the device is used instead of an external DHCP server, the assignment of the network address can be completed in a short period of time. That is, since the negotiation at the time of the wireless connection is completed in a short period of time, it is possible to perform the exchange of data even in a situation where the transmission/reception of the data cannot be performed by the conventional wireless LAN such as when the vehicles pass each other, and it is possible to relay the data to the management server in a short period of time.

In addition, since the network address space differs from one communication device to another, it is not necessary to consider competition with other communication devices, and it is possible to simplify the device as compared with the configuration in which many communication devices use the same network address.

Herein, the result of measurement of the communication speed in a case where the data is actually transferred by using the vehicle-mounted communication device according to the present embodiment will be described.

Figure 8:
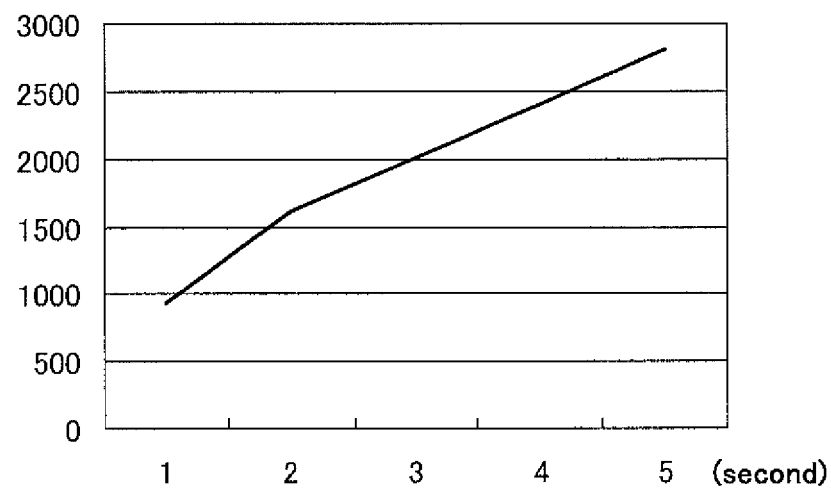
FIG. 8 shows the result of performance measurement of the vehicle-mounted communication device according to the first embodiment.

FIG. 8 is a graph indicative of the amount of data transferred within a predetermined time in a case where message transfer is performed between the vehicle-mounted communication devices according to the present embodiment. The horizontal axis indicates a time (second) when the communication is permitted, while the vertical axis indicates the number of messages (1 message=256 bytes) transmitted within the permission time. Note that UDP is used as the communication protocol of a transport layer and 1 packet corresponds to 5 messages (1280 bytes)+a MAC address (6 bytes).

As the result of performance measurement, a time required for the negotiation between the communication devices was 19 milliseconds on average. It was possible to transmit 927 messages in a case where the communication permission time was set to 1 second, and it was possible to transmit 2814 messages in a case where the communication permission time was set to 5 seconds.

In a case where vehicles oppose each other at a speed of 60 km per hour and a wireless communication distance is 100m, the communicable time is about 3 seconds. In the conventional wireless LAN, the authentication, the assignment of the address, and the communication need to be performed within the communicable time, and hence it was almost impossible to perform the communication when the vehicles passed each other. In contrast to this, it was confirmed that the vehicle-mounted communication device according to the present embodiment was able to perform the communication with no problem.

(Second Embodiment)

In a second embodiment, the vehicle-mounted communication device according to the first embodiment provides a plurality of virtual access points. Although the system configuration of the vehicle-mounted communication device according to the second embodiment is the same as that of the first embodiment, the system configuration thereof is different from that of the first embodiment in that the downlink communication section 12 generates a plurality of virtual ESS-IDs. The technology for dividing a single physical access point into a plurality of logical access points by generating the virtual ESS-IDs is well-known, and hence the detailed description thereof will be omitted.

In the second embodiment, the downlink communication section 12 virtually generates the ESS-ID for in-vehicle use and the ESS-ID for outside-vehicle use in addition to the ESS-ID for inter-vehicle connection (i.e., each ID shown in FIG. 5). That is, three virtual access points are generated.

The communication device is capable of connecting to each virtual access point, and only the virtual access point for the inter-vehicle connection supports the reception processing of the uplink data shown in FIG. 7. That is, in a case where another communication device connects to the virtual access point for in-vehicle use and the virtual access point for outside-vehicle use, only the sequential transfer of packets in an uplink direction is performed and the relay processing of the uplink data shown in FIG. 6 is not performed.

Figure 9:
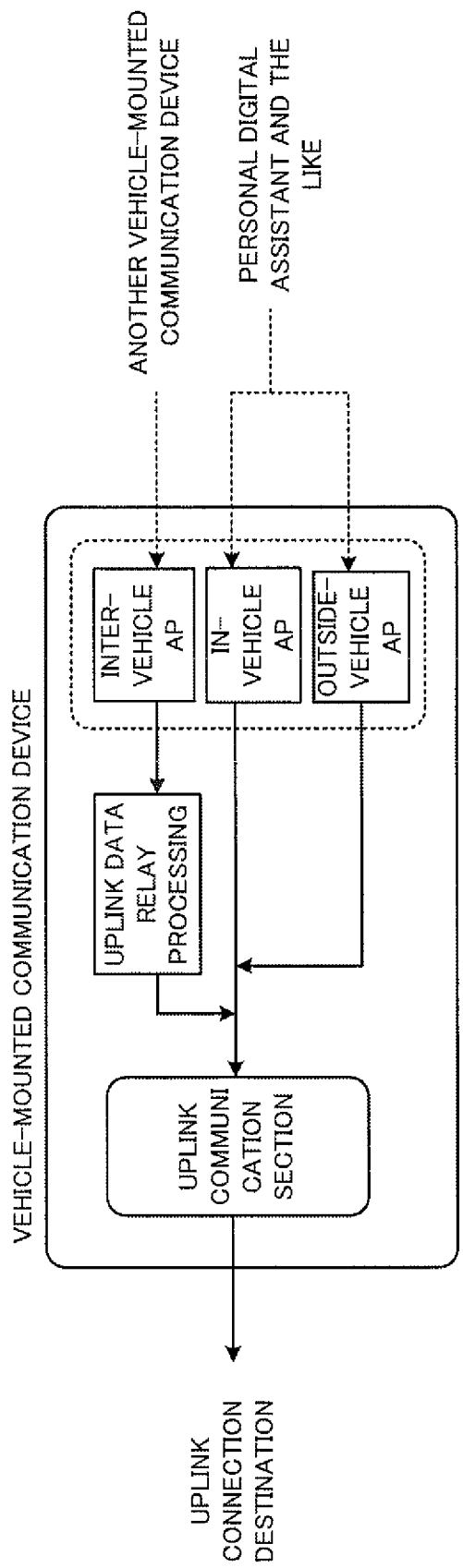
FIG. 9 is a view showing a data flow in a second embodiment.

FIG. 9 is a view schematically showing a data flow in the second embodiment. An "inter-vehicle AP" shown in FIG. 9 corresponds to the virtual access point for the inter-vehicle connection, and an "in-vehicle AP" and an "outside-vehicle AP" correspond to the virtual access points that are not used for the inter-vehicle connection. The uplink data received via the inter-vehicle AP is processed by the control section 13, and is relayed to the uplink side. As shown in FIGS. 6 and 7, the uplink data is temporarily stored, and then automatically relayed after the uplink connection is established. In contrast to this, the data received via the in-vehicle AP or the outside-vehicle AP is transferred to the uplink side on a real-time basis. In a case where the uplink connection does not communicate with the Internet, the communication cannot be performed.

In the first embodiment, the vehicle-mounted communication device connected to the downlink communication section is capable of transmitting only the uplink data. However, in the second embodiment, by generating the virtual access point only for the simple transfer of the packet, it is possible to connect other devices to the Internet. For example, it is possible to connect the personal digital assistant owned by the passenger to the Internet via the vehicle-mounted communication device.

(Modification)

Note that each of the above-described embodiments is only an example, and the present invention can be appropriately changed and implemented without departing from the gist thereof.

For example, after the uplink data is transmitted to the uplink side in Step S25, the uplink data may be deleted, or the data may be transmitted to another vehicle-mounted communication device with the data being retained. For example, by retaining the data for a predetermined time and transmitting the data again when the uplink connection destination is changed, it is possible to locate more routes to the Internet gateway. However, it is preferable to put a limit to the number of times of the transmission such that the number of times of the transmission is not increased extremely.

In addition, an expiration time may be set for the uplink data and, of the uplink data stored in the data cache section 15, the expired uplink data may not be extracted in Step S21 or may be deleted. In a case where the communication with the Internet is established after the Internet connection is not established for a long time period, there is a possibility that old information is uploaded. However, by setting the expiration time for the uplink data, it is possible to avert the possibility. In addition, an ID for identifying the uniqueness of the data is assigned to the uplink data, and the uplink data may be checked such that the same data is not transmitted to the same connection destination repeatedly.

Further, in the description of the embodiments, by connecting to the access point connected to the wide area network, the uplink data is transmitted to the management server. However, it is not always necessary to use the wide area network. For example, the access point may be provided in the management server, and the uplink data may be collected without using the wide area network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-245508, filed on Nov. 7, 2012, which is hereby incorporated by reference herein in its entirety.

REFERENCE SIGNS LIST

10 VEHICLE-MOUNTED COMMUNICATION DEVICE
11 UPLINK COMMUNICATION SECTION
12 DOWNLINK COMMUNICATION SECTION
13 CONTROL SECTION
14 DATA ACQUISITION SECTION
15 CACHE SECTION
16 ADDRESS MANAGEMENT SECTION
17 AUTHENTICATION SECTION

The invention claimed is:

1. A vehicle-mounted communication device for transmitting uplink data as data generated in a first vehicle, comprising:
    a first wireless communication unit configured to establish an uplink connection to a second vehicle-mounted communication device mounted on a second vehicle;
    a second wireless communication unit configured to establish a downlink connection to a third vehicle-mounted communication device mounted on a third vehicle;
    and a processor functioning as:
        an authentication unit configured to authenticate the third vehicle-mounted communication device;
        an address management unit configured to assign a network address to the third vehicle-mounted communication device; and
        an address translation unit configured to perform translation of the network address assigned from the second vehicle-mounted communication device and the network address used by the vehicle-mounted communication device,
    wherein in a case where an access point connected to a wide area network is available, the first wireless communication unit establishes the uplink connection to the access point, and in a case where the access point is not available, the first wireless communication unit establishes the uplink connection to the second vehicle-mounted communication device mounted on the second vehicle.

2. The vehicle-mounted communication device according to claim 1, wherein the second wireless communication unit receives the uplink data transmitted from the third vehicle-mounted communication device, and the first wireless communication unit transmits the uplink data generated in a host vehicle or the uplink data received from the third vehicle-mounted communication device to the second vehicle-mounted communication device or the access point through the uplink connection.

3. The vehicle-mounted communication device according to claim 2, wherein the processor further functions as:

a data transfer unit configured to temporarily store the uplink data generated in the host vehicle or the uplink data received from the third vehicle-mounted communication device, and to transfer the uplink data to the second vehicle-mounted communication device or the access point through the first wireless communication unit, wherein the data transfer unit transmits the stored uplink data at a timing when the first wireless communication unit establishes the uplink connection to the access point or the second vehicle-mounted communication device.

4. The vehicle-mounted communication device according to claim 3, wherein the second wireless communication unit provides a plurality of network identifiers, and relays data received via at least one of the plurality of network identifiers to the first wireless communication unit without an intervention of the data transfer unit.

5. The vehicle-mounted communication device according to claim 1, wherein the uplink data is data acquired from a sensor provided in the vehicle.

6. An inter-vehicle communication system comprising:
a plurality of the vehicle-mounted communication devices according to claim 1; and
an access point that provides an access to a wide area network.

7. The inter-vehicle communication system according to claim 6, wherein the plurality of the vehicle-mounted communication devices perform communication by using different network address spaces.

8. A communication method performed by a vehicle-mounted communication device for transmitting uplink data as data generated in a first vehicle, comprising the steps of:

establishing an uplink connection to a second vehicle-mounted communication device mounted on a second vehicle;

establishing a downlink connection to a third vehicle-mounted communication device mounted on a third vehicle;

authenticating the third vehicle-mounted communication device;

assigning a network address to the third vehicle-mounted communication device; and performing translation of the network address assigned from the second vehicle-mounted communication device and the network address used by the vehicle-mounted communication device, wherein in a case where an access point connected to a wide area network is available, establishing the uplink connection to the access point, and in a case where the access point is not available, establishing the uplink connection to the second vehicle-mounted communication device mounted on the second vehicle.

* * * * *